(12) United States Patent
Iwasawa et al.

(10) Patent No.: US 11,899,109 B2
(45) Date of Patent: Feb. 13, 2024

(54) LASER SCANNING SENSOR

(71) Applicant: OPTEX CO., LTD., Shiga (JP)

(72) Inventors: Masashi Iwasawa, Otsu (JP);
Masashiro Morita, Otsu (JP)

(73) Assignee: OPTEX CO., LTD., Shiga (JP)

( * ) Notice: Subject to any disclaimer, the term of this patent is extended or adjusted under 35 U.S.C. 154(b) by 734 days.

(21) Appl. No.: 17/117,453

(22) Filed: Dec. 10, 2020

(65) Prior Publication Data
US 2021/0278534 A1 Sep. 9, 2021

(30) Foreign Application Priority Data

Mar. 3, 2020 (JP) .................................. 2020-036111

(51) Int. Cl.
| | | |
|---|---|---|
| *G01S 17/10* | (2020.01) | |
| *G01S 7/481* | (2006.01) | |
| *G01S 7/495* | (2006.01) | |
| *G08B 13/184* | (2006.01) | |

(52) U.S. Cl.
CPC ............ *G01S 17/10* (2013.01); *G01S 7/4814* (2013.01); *G01S 7/4817* (2013.01); *G01S 7/495* (2013.01); *G08B 13/184* (2013.01)

(58) Field of Classification Search
None
See application file for complete search history.

(56) References Cited

U.S. PATENT DOCUMENTS

| | | | | |
|---|---|---|---|---|
| 7,336,407 | B1 * | 2/2008 | Adams ................... | G01S 7/4817 359/211.1 |
| 2009/0091446 | A1 * | 4/2009 | Jang ...................... | G08B 13/184 340/557 |
| 2015/0212209 | A1 | 7/2015 | Iwasawa et al. | |

FOREIGN PATENT DOCUMENTS

JP          2014-059834          4/2014

* cited by examiner

*Primary Examiner* — Eric L Bolda
(74) *Attorney, Agent, or Firm* — Wenderoth, Lind & Ponack, L.L.P.

(57) ABSTRACT

A laser scanning sensor includes a distance data acquisition unit which acquires distance information in each measurement direction, and a memory which stores, as background distance information, a distance of an outer periphery of the detection area in each measurement direction. The sensor also includes a mirror surface determination unit which determines the presence of a reflecting surface when the distance information in continuous measurement directions is greater by at least a predetermined distance than the corresponding background distance information, and when this state changes thereafter by at least a predetermined rate in a predetermined time, a human body determination unit which extracts a portion of the distance information that may correspond to a human body and determines whether it corresponds to a human body, and an alarm output control unit which outputs an alarm signal when the presence of the reflecting surface or the human body is confirmed.

4 Claims, 11 Drawing Sheets

LASER SCANNING SENSOR

CROSS-REFERENCE TO RELATED APPLICATIONS

The present application claims priority under 35 U.S.C. § 119(a) to Japanese Patent Application No. 2020-036111, filed Mar. 3, 2020. The contents of this application are incorporated herein by reference in its entirety.

BACKGROUND OF THE INVENTION

Field of the Invention

The present invention relates to a laser scanning sensor which detects an intruder or the like into building premises, and particularly relates to a laser scanning sensor which can detect a person even if he/she is trying to enter such premises by diverting reflected light by a mirror or the like to make him-/herself undetectable and which can thus prevent so-called "alarm failures" as best as possible.

Related Art

Among the conventionally known security devices, there is a microwave sensor which emits microwaves to a detection area. If an intruder is present in the detection area, this microwave sensor catches a microwave reflected by the intruder and thereby detects the presence of the intruder.

The inventors of the present invention have already proposed a laser scanning sensor which can eliminate or correct undesirable influences on the laser beam during outdoor use in bad weather as best as possible, and which can improve the detection precision of an intruder or the like in thick fog, heavy rain, heavy snow, etc. than the conventional products (see JP 2014-059834 A).

The laser scanning sensor described in this patent document is characterized as follows. The laser scanning sensor includes a laser distance meter (laser range finder), a scanning mechanism unit, a distance information acquisition unit, a distance information interpolation unit, a determination unit, an alarm signal output unit, and a detection area information storage unit. The laser distance meter emits a laser beam, and measures a distance to at least one object present in a direction of the laser beam, based on a time until the laser beam reflects off the at least one object and returns to the laser distance meter. The scanning mechanism unit changes a measurement direction by the laser distance meter. The distance information acquisition unit defines a detection area and sequentially acquires distance information containing at least one distance measured in each measurement direction in the detection area, by allowing the scanning mechanism unit to change the measurement direction and allowing the laser distance meter to make a periodic measurement. The distance information interpolation unit carries out an interpolation process for each measurement direction. The interpolation process is effected when a piece of the distance information acquired by the distance information acquisition unit is determined to correspond to an unintended object that exists at a shorter distance than an object to be originally detected, and when complementation of a piece of the distance information corresponding to the unintended object is determined to be possible based on a piece of the distance information acquired in an adjacent measurement direction or a piece of the distance information acquired at a previous measurement cycle. The interpolation process includes replacing the piece of the distance information in the measurement direction corresponding to the unintended object with an interpolated value based on the piece of the distance information acquired in the adjacent measurement direction at a same measurement cycle or with an interpolated value based on the piece of the distance information acquired in the measurement direction at the previous measurement cycle. The determination unit extracts a portion of the distance information that may correspond to an object or a human body, wherein the distance information has been acquired by the distance information acquisition unit and has been subjected to the interpolation process by the distance information interpolation unit as required. Then, the determination unit determines whether the extracted portion of the distance information corresponds to an object or a human body, based on a sequential movement status regarding the extracted portion of the distance information. The alarm signal output unit outputs an alarm signal when the determination unit confirms the presence of an object or a human body. The detection area information storage unit stores, as detection area information, a maximum detectable distance, or a distance corresponding to an outer periphery of the detection area in each measurement direction. The distance information interpolation unit determines that a piece of the distance information corresponds to the unintended object that exists at a shorter distance than the object to be originally detected, if a distance difference between the detection area information and a maximum distance contained in the distance information acquired in each measurement direction by the distance information acquisition unit is equal to or greater than a predetermined value.

In critical facilities such as nuclear power plants and airports, range-finding laser scanning sensors are utilized for plane guarding due to the following reason. Range-finding laser scanning sensors can spot the position of an intruder, and can zoom in and record the intruder where necessary, which cannot be achieved by surveillance cameras that require visual inspection, peripheral guarding that can be broken by jumping or crawling, or thermal detection sensors that detect body temperature of an intruder or the like.

Figure 8:
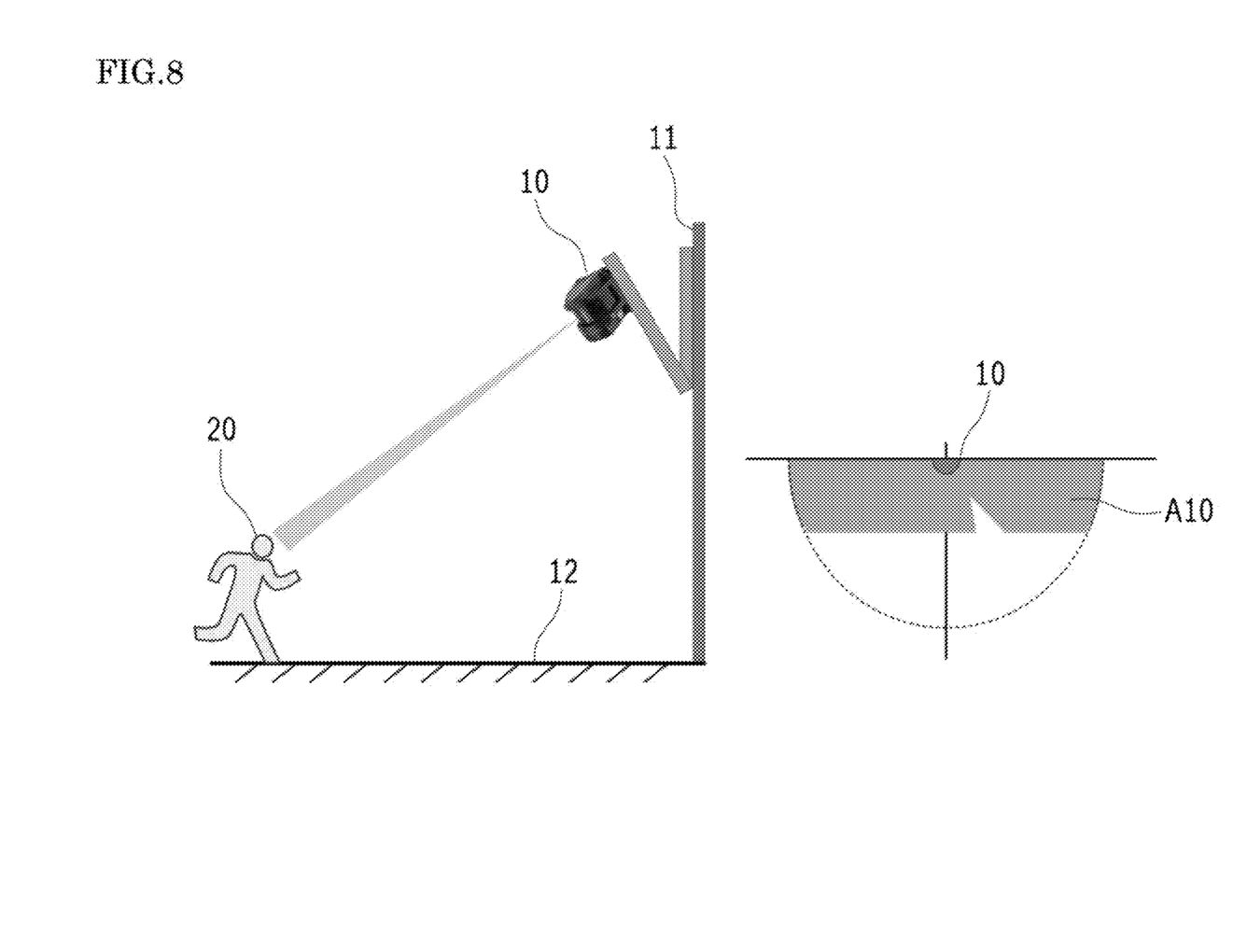
FIG. 8 is a schematic explanatory illustration for the basic principle of human body detection by a conventional laser scanning sensor 10.

FIG. 8 is a schematic explanatory illustration for the basic principle of human body detection by a conventional laser scanning sensor 10. The left half of the drawing shows the positional relationship of the laser scanning sensor 10 and an intruder 20, etc. The right half of the drawing shows a detection state in a scanning area A10.

As shown in FIG. 8, suppose that the laser scanning sensor 10 is installed, for example, on an upper part of a wall surface 11 and directed obliquely downward, and that an intruder 20 is coming. This laser scanning sensor 10 acquires distance data in each measurement direction while no intruder, etc. is present in the scanning area A10 (e.g. during installation work), and stores the acquired distance data as background distance data. Normally, the background distance data corresponds to the distance to the outer periphery such as a ground surface 12 in each measurement direction. In the right half of FIG. 8, the outer periphery (in broken line) of the semicircular scanning area A10 corresponds to the maximum detectable distance.

When a laser beam is blocked by the intruder 20 in a part of the measurement directions, the distance data acquired in the blocked range may be shorter than the corresponding background distance data. In other words, from the fact that the distance data acquired in a part of the measurement directions in the scanning area A10 is shorter than the background distance data, the laser scanning sensor 10 can detect the presence of a certain object (for example, the intruder 20) in the scanning area A10.

However, the laser scanning sensor determines the presence or absence of an object by measuring a distance based on reflected light. In the absence of reflected light, the distance data is infinity, and the laser scanning sensor determines that no object is present in that direction. Eventually, an intruder can enter the premises by diverting reflected light by a mirror or the like to make him-/herself undetectable. For the laser scanning sensor, this is an alarm failure. Specific examples are given below.

Figure 9:
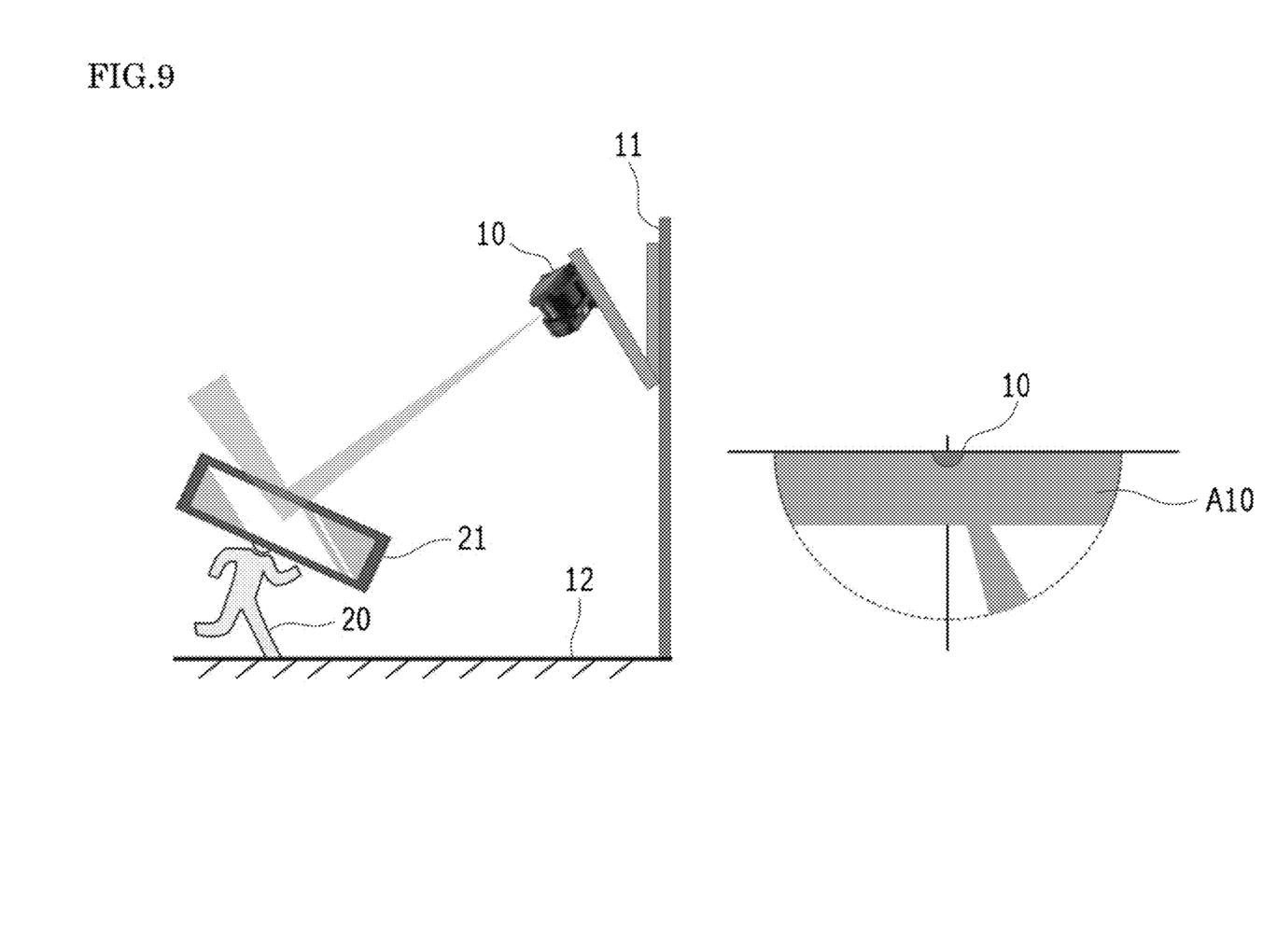
FIG. 9 is a schematic explanatory illustration showing, as an example, a situation where human body detection by the laser scanning sensor 10 is hampered by a mirror 21.

FIG. 9 is a schematic explanatory illustration showing, as an example, a situation where human body detection by the laser scanning sensor 10 is hampered by a mirror 21. The left half of the drawing shows the positional relationship of the laser scanning sensor 10 and the intruder 20, etc. The right half of the drawing shows a detection state in the scanning area A10.

The intruder 20 shown in FIG. 9 holds, for example, a large mirror 21 that can shield his/her body almost entirely. When reflected light of the laser beam emitted by the laser scanning sensor is diverted by the mirror 21 and does not return to the laser scanning sensor 10, the distance data is infinity, and the laser scanning sensor 10 determines that no object is present in that direction. Eventually, the laser scanning sensor 10 fails to output an alarm signal despite the presence of the intruder 20, which is an alarm failure.

Figure 10A:
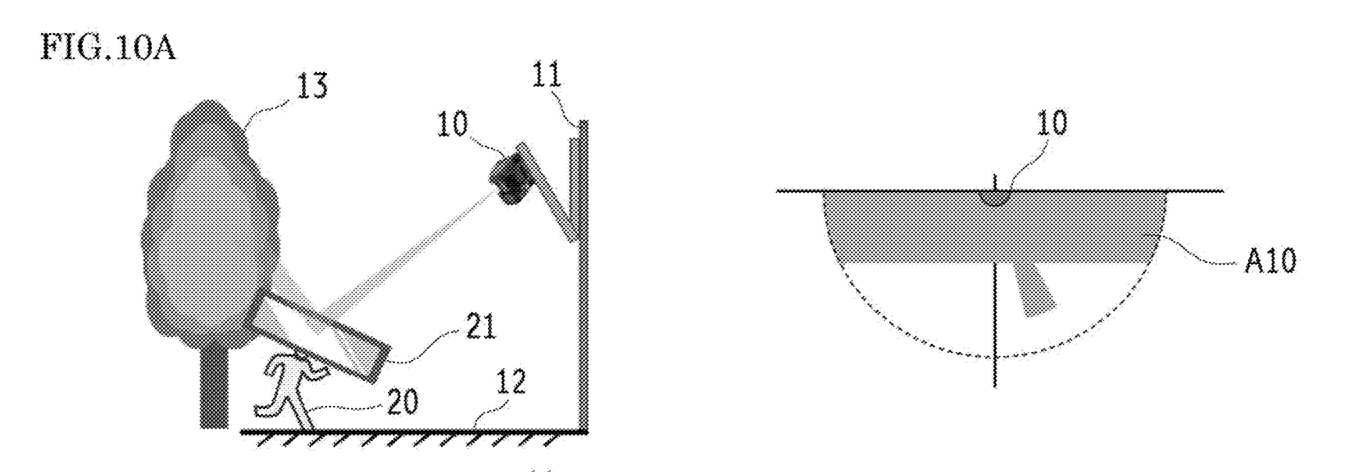
Figure 10B:
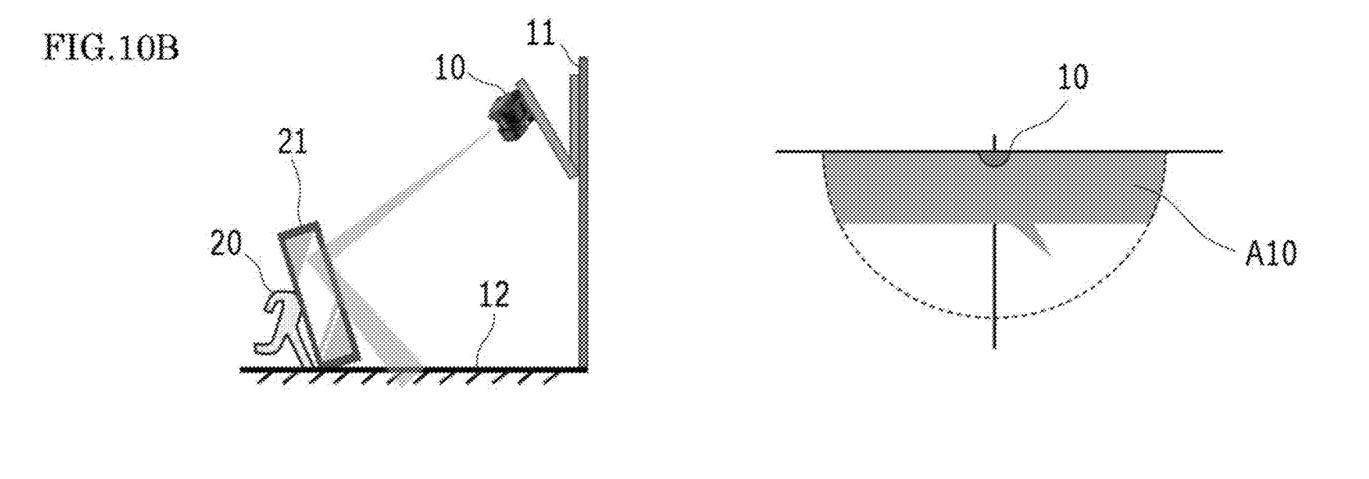

FIG. 10A and FIG. 10B are schematic explanatory illustrations showing, as examples, two different situations where human body detection by the laser scanning sensor 10 is hampered by a mirror 21. FIG. 10A shows a situation where an obstruction is present nearby in the direction of the reflected light diverted by the mirror 21. FIG. 10B shows a situation where the reflected light diverted by the mirror 21 is directed to the ground surface. Similar to the above-mentioned drawings, the left half of each drawing shows the positional relationship of the laser scanning sensor 10 and the intruder 20, etc. The right half of each drawing shows a detection state in the scanning area A10.

Specifically, when reflected light of the laser beam emitted by the laser scanning sensor 10 is diverted by the intruder 20 holding a large mirror 21, an obstruction such as a tree 13 may be present nearby in the direction of the diverted reflected light as shown in FIG. 10A or the diverted reflected light may be directed to the ground surface as shown in FIG. 10B. In either of these cases, the distance data is greater than at least the background distance data, and the laser scanning sensor 10 still determines that no object is present in that direction. Eventually, the laser scanning sensor 10 fails to output an alarm signal despite the presence of the intruder 20, which is an alarm failure.

Figure 11:
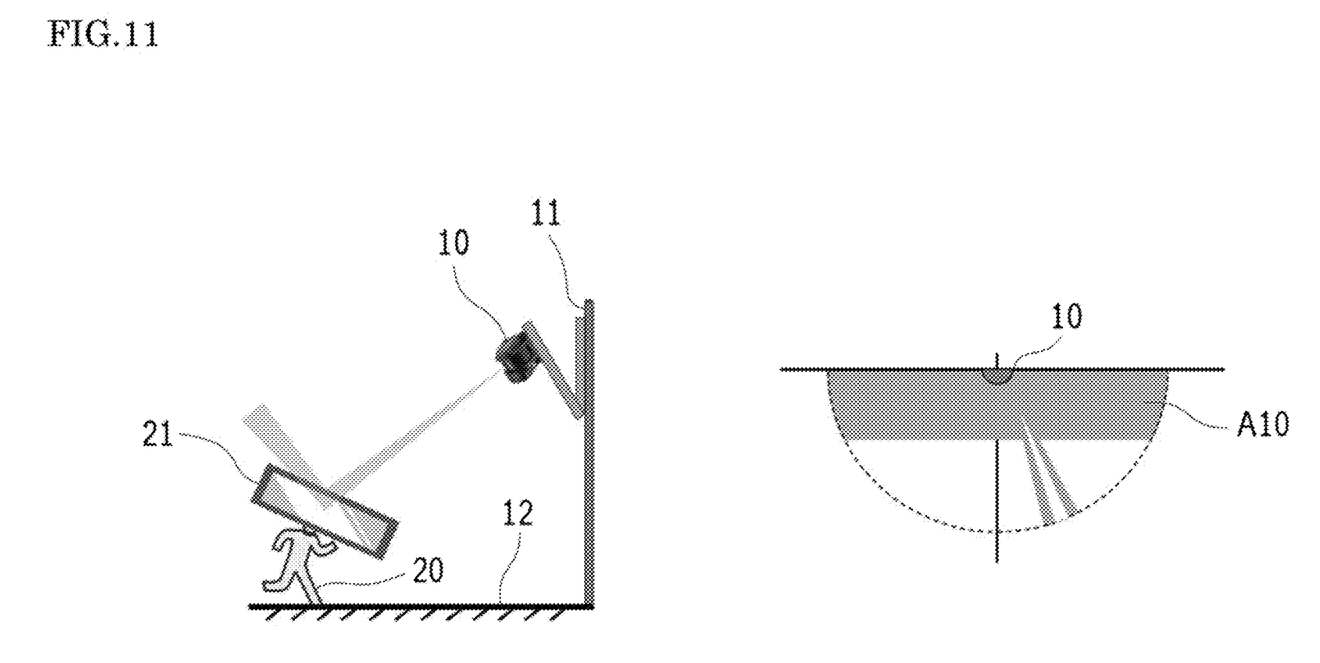
FIG. 11 is a schematic explanatory illustration showing, as an example, another situation where human body detection by the laser scanning sensor 10 is hampered by a mirror 21.

FIG. 11 is a schematic explanatory illustration showing, as an example, another situation where human body detection by the laser scanning sensor 10 is hampered by a mirror 21. The left half of the drawing shows the positional relationship of the laser scanning sensor 10 and the intruder 20, etc. The right half of the drawing shows a detection state in the scanning area A10.

The situation illustrated in FIG. 11 is almost identical to the one illustrated in FIG. 9, except that the intruder 20 is not completely shielded by the mirror 21 and the laser beam reflects off a part of the intruder 20 and returns to the laser scanning sensor 10. In this case, the distance data acquired with respect to the reflected light from the intruder 20 is shorter than the background distance data, but the angular width in which such data is acquired continuously is narrow. Eventually, the laser scanning sensor 10 determines that a certain object may be present but that the object is not a human body. The laser scanning sensor 10 still fails to output an alarm signal despite the presence of the intruder 20, which is an alarm failure.

According to the European Technical Specifications relating to laser scanning, detection of a mirror is a requirement for grade 4. This means it is not an exceptional object but rather a common object to detect a mirror in the above-mentioned situations.

SUMMARY OF THE INVENTION

The present invention provides a laser scanning sensor which is capable of detecting an intruder, even if he/she is trying to enter the premises by using a mirror or the like, by distinguishing the reflection by the mirror surface, and which thereby prevents alarm failures as best as possible.

A laser scanning sensor according to an aspect of the present invention is characterized by including: a laser distance meter which emits a laser beam, and which measures a distance to at least one object present in a direction of the laser beam, based on a time until the laser beam reflects off the at least one object and returns to the laser distance meter; a scanning mechanism unit which changes a measurement direction by the laser distance meter; a distance information acquisition unit which defines a detection area and which sequentially acquires distance information containing at least one distance measured in each measurement direction in the detection area, by allowing the scanning mechanism unit to change the measurement direction and allowing the laser distance meter to make a periodic measurement; a detection area information storage unit which stores, as background distance information, a distance corresponding to an outer periphery of the detection area in each measurement direction; a first determination unit which determines that a reflecting surface is present, wherein the presence of the reflecting surface is determined when the distance information acquired by the distance information acquisition unit, in continuous measurement directions corresponding to a predetermined width or less, is greater by at least a predetermined distance than the background distance information in the respective measurement directions stored in the detection area information storage unit, and when this state changes thereafter by at least a predetermined rate in a predetermined time; a second determination unit which extracts a portion of the distance information that may correspond to a human body, the distance information having been acquired by the distance information acquisition unit, and which determines whether the extracted portion of the distance information corresponds to a human body, based on a sequential movement status regarding the extracted portion of the distance information; and a first alarm signal output unit which outputs a first alarm signal when the first determination unit has confirmed the presence of the reflecting surface or when the second determination unit has confirmed the presence of the human body.

This laser scanning sensor may further include a first determination disabling unit which prevents the determination by the first determination unit from being reflected to the first alarm signal. The first determination unit may be capable of changing sensitivity in determining the presence of the reflecting surface, in at least two stages, by changing at least one of the predetermined width, the predetermined distance, the predetermined time, and the predetermined rate. The laser scanning sensor may further include a second alarm signal output unit which outputs a second alarm signal when the first determination unit has determined the presence of the reflecting surface.

The laser scanning sensor according to the above-described configuration is capable of detecting an intruder, even if he/she is trying to enter the premises by using a mirror or the like, by distinguishing the reflection by the mirror surface, and can thereby prevent alarm failures as best as possible.

The laser scanning sensor according to the present invention is capable of detecting the intruder who is trying to enter the premises by using a mirror or the like, and can thereby prevent alarm failures as best as possible.

BRIEF DESCRIPTION OF THE DRAWINGS

FIG. 3A and FIG. 3B are schematic explanatory illustrations for the basic principle of mirror surface detection by the laser scanning sensor 100. FIG. 3A shows a case where correct reflection information is not at all available. FIG. 3B shows a case where reflection information from the mirror is partially available.

FIG. 10A and FIG. 10B are schematic explanatory illustrations showing, as examples, two different situations where human body detection by the laser scanning sensor 10 is hampered by a mirror 21.

FIG. 10A shows a situation where an obstruction is present nearby in the direction of the reflected light diverted by the mirror 21. FIG. 10B shows a situation where the reflected light diverted by the mirror 21 is directed to the ground surface.

DESCRIPTION OF PREFERRED EMBODIMENTS

Hereinafter, an embodiment of the present invention is described with reference to the drawings.

<Overall Configuration of a Laser Scanning Sensor 100>

Figure 1:
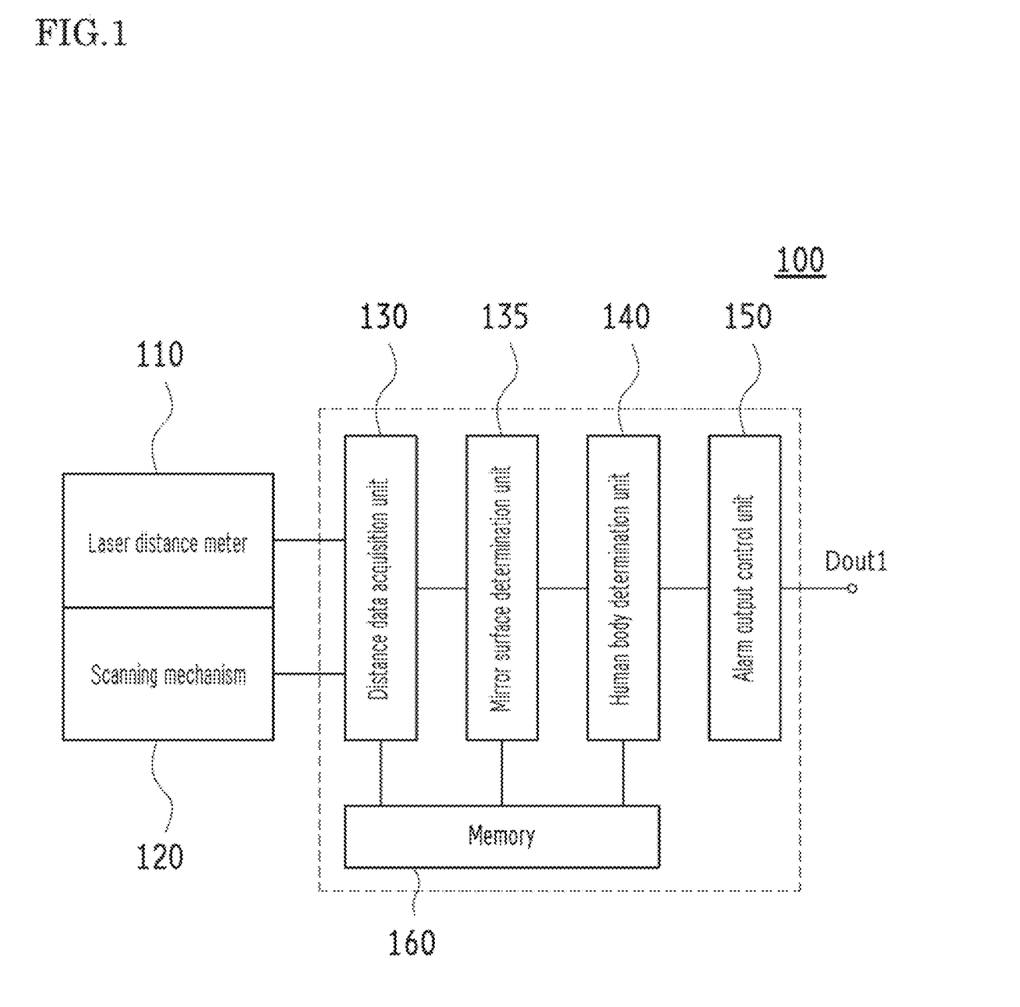
FIG. 1 is a block diagram showing a schematic configuration of a laser scanning sensor 100 according to an embodiment of the present invention.
Figure 2:
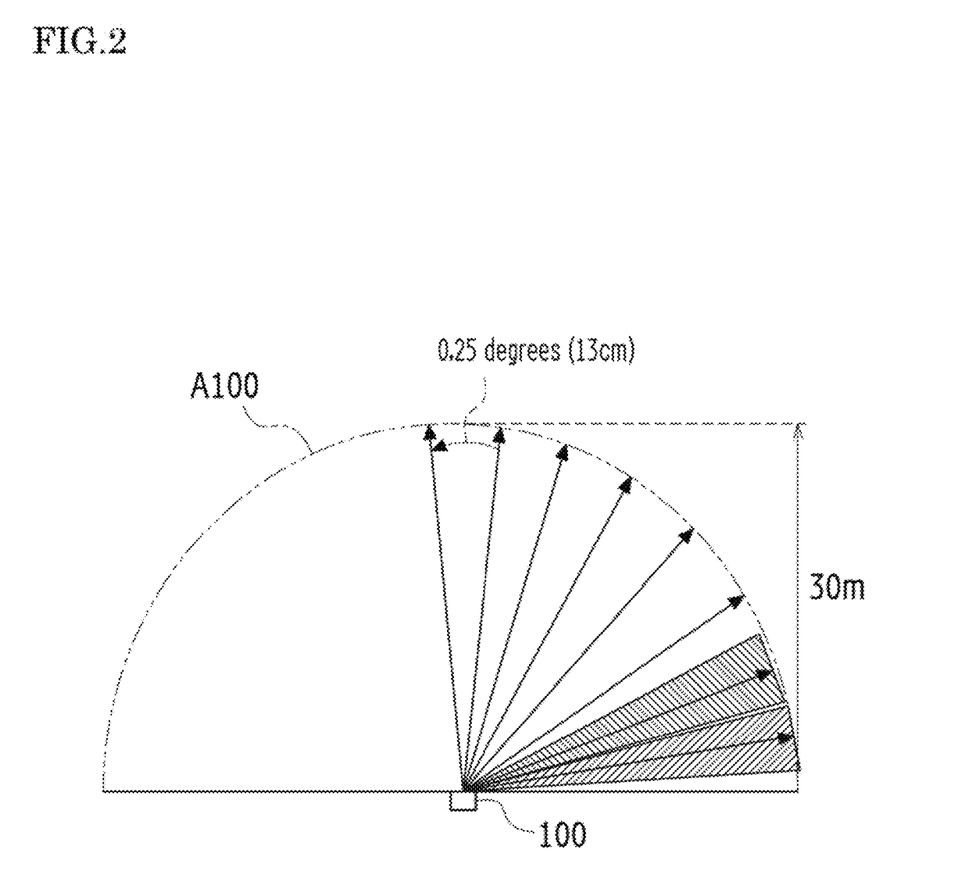
FIG. 2 is a schematic plan view showing a detection area A100 defined by the laser scanning sensor 100.

FIG. 1 is a block diagram showing a schematic configuration of a laser scanning sensor 100 according to an embodiment of the present invention. FIG. 2 is a schematic plan view showing a detection area A100 defined by the laser scanning sensor 100. In FIG. 2, intervals between adjacent distance measurement directions are shown on a far greater scale than in reality, which is merely for the purpose of illustration.

As shown in FIG. 1, the laser scanning sensor 100 includes a laser distance meter (laser range finder) 110, a scanning mechanism 120, a distance data acquisition unit 130, a mirror surface determination unit 135, a human body determination unit 140, an alarm output control unit 150, and memory 160.

The laser distance meter 110 acquires distance data by emitting a pulse laser beam in a certain direction and precisely measuring a fractional time until a beam reflects off at least one object in this direction and returns to the laser distance meter 110. Thereby, the laser distance meter 110 accurately measures the distance to each object and acquires distance data including a distance value for each object. Although the laser distance meter 110 may acquire three or more distance values in a measurement direction in some situations, it is supposed that the laser distance meter 110 acquires a maximum of two distance values from the short distance side in this embodiment. It goes without saying that this configuration should not be taken as a limitation.

In the laser distance meter 110, a light-emitting element for the laser beam may be, for example, a semiconductor laser diode (LD). A light-receiving element may be, for example, an avalanche photodiode (APD). For drive control of the light-emitting element and for measurement of the time until the return of the reflected beam, it is desirable to provide dedicated hardware circuits or the like. Generally, the laser distance meter is characterized by its ability to make a precise measurement up to a rather long distance, for example, to a maximum of several tens of meters, or even much longer depending on the situation. In this embodiment, the maximum detection range of the laser distance meter 110 is set to 30 meters.

The scanning mechanism 120 is configured to rotate by means of a built-in motor (not shown) or the like. The scanning mechanism 120 is mechanically connected with at least a part of the laser distance meter 110 so as to change the distance measurement direction (angle) by the laser distance meter 110. For example, the laser distance meter 110 may be allowed to rotate only at an optical system thereof or to rotate as a whole, or may adopt another configuration. When the scanning mechanism 120 rotates in a predetermined direction at a constant speed, the distance measurement direction by the laser distance meter 110 changes in conjunction with this rotation.

By allowing the scanning mechanism 120 to change the measurement direction and allowing the laser distance meter 110 to make a periodic measurement, the distance data acquisition unit 130 defines a detection area A100 as shown in FIG. 2, and sequentially acquires distance data at a predetermined time interval in each measurement direction (which may be also called "step") which is set at a predetermined angular interval within the detection area A100.

The distance data acquisition unit 130 also acquires distance data in each measurement direction, in a state where a human body or the like is not at all present in the detection area A100 (e.g. during installation work). The distance data acquired in this state corresponds to the distance to the outer periphery (e.g. a ground surface 12 in that measurement direction) of the detection area A100, and each piece of the distance data in this state is stored in the memory 160 as background distance data.

Regarding the scanning mechanism 120, the scanning cycle T may be set, for example, 50 ms (20 scans per second), and the pulse laser beams may be emitted in the range of a half rotation, i.e. 180 degrees, with a pulse width of 34 ns at an emission cycle of 34.7 μs. The thus set scanning mechanism 120 can make 720 measurements in the range of 180 degrees. In this case, the angular interval for the distance measurement is 0.25 degrees, which is as little as a width of about 13 cm even 30 meters away as shown in FIG. 2, ensuring a considerably high spatial resolution in the detection area A100. Therefore, based on the distance data acquired by the distance data acquisition unit 130, it is possible to identify the position, size (width), shape, etc. of a detected object very accurately, and to determine whether the detected object is a human body. Even if more than one human body is present in the detection area A100, each human body can be identified independently. Besides, the distance data can be acquired at each scanning cycle T, namely, at every 50 ms. It should be understood that the numerical values given herein are mere examples.

The mirror surface determination unit 135 analyzes the distance data acquired by the distance data acquisition unit 130. Specifically, first of all, regarding a part of continuous measurement directions in the entire measurement directions, the mirror surface determination unit 135 extracts every portion, if any, in which the distance data acquired by the distance data acquisition unit 130 is greater than, or more preferably, greater by at least a predetermined distance than, the background distance data stored in the memory 160. Next, the mirror surface determination unit 135 calculates an actual width, based on the distance data in the measurement directions corresponding to each extracted portion and also based on the angular interval between opposite ends of the continuous measurement directions. The mirror surface determination unit 135 then determines whether the actual width is smaller than an assumed maximum width of a mirror 21. When these conditions are satisfied, the mirror surface determination unit 135 continues to monitor temporal variations in each extracted portion. If the change rate in a given time is greater than a predetermined threshold value, the mirror surface determination unit 135 determines that the mirror 21 is present. This is because it is extremely difficult for the intruder 20 to keep holding the mirror 21 in such a stable manner as to divert the laser beam precisely and continuously, and also because an object having a certain volume other than the intruder 20 cannot trigger such an excessive change.

The human body determination unit 140 also analyzes the distance data acquired by the distance data acquisition unit 130. The human body determination unit 140 compares the distance data for each measurement direction with the corresponding background distance data stored in the memory 160 or with the distance data acquired in an earlier measurement cycle. This comparison reveals a possibility, in the measurement direction in which the distance data has changed, that an object may have entered the detection area or that an existing object in the detection area may have moved. By effecting two-dimensional development based on each of the distance data measurement directions, the human body determination unit 140 extracts a portion of data that is assumed to be a human body shape, judging from the shape and range of the object that has entered or moved.

For example, in the case where the intruder 20 faces to the laser scanning sensor 100, the width of the body trunk is about several tens of centimeters, which is supposed to be 40 cm for the purpose of description. At the distance of 30 meters, the width of the body trunk corresponds to about three pieces of adjacent data. If the distance to the person gets shorter, the width across the pieces of adjacent data decreases proportionately. For example, the width across the pieces of adjacent data is about 8.8 centimeters at the distance of 20 meters, and is about 4.4 centimeters at the distance of 10 meters. At the same time, however, the number of pieces of adjacent data corresponding to the actual width of the same body trunk increases. For example, at the distance of 10 meters, the width of 40 centimeters corresponds to about nine pieces of adjacent data. Needless to say, in the case where the intruder 20 does not face to the laser scanning sensor 100 but faces obliquely or transversely, the distance data represents a narrower width.

Besides, considering the gently curved figure of the human body, the distance represented by the pieces of corresponding adjacent data should get slightly shorter toward the center of the data. Specifically, the distance data will show a downwardly protruding gentle curve with a constant width. If the distance data contains such a pattern, the object is likely to be a human body. On the other hand, if the width is too narrow, or is too wide and straight, the object is obviously not a human body.

The distance data has been sequentially acquired by the distance data acquisition unit 130. Thereafter, the human body determination unit 140 checks how the extracted portion of the distance data assumed to be a human body has been changing in subsequent distance data, and grasps the state of movement on the extracted portion of the distance data. If the track of movement is unusually discontinuous, it is highly unlikely that the object is a human body. In contrast, if the track of movement is completely stationary or shows a very slight distance of movement, it is at least possible to determine that the object is not an intruder to be alerted. By considering the direction of movement and other factors, it is further possible to enhance the accuracy of distinction about whether the object is an intruder to be alerted or a mere pedestrian walking near the boundary of the detection area A100. Then, taking all of these distinction results and other factors into consideration, the human body determination unit 140 determines whether a human body to be alerted is present or not.

In this embodiment, if an object is detected at a distance of 30 meters or more, which is outside the detection area A100, the object is not subjected to the human body determination process described above. However, this should not be construed in a limitative manner.

The alarm output control unit 150 outputs an alarm signal Dout1 when the mirror surface determination unit 135 has determined the presence of a mirror 21 or when the human body determination unit 140 has determined the presence of a human body.

The distance data acquisition unit 130, the mirror surface determination unit 135, the human body determination unit 140, the alarm output control unit 150, the memory 160, and the like (the elements enclosed by the broken line in FIG. 1) may be configured, for example, by a built-in one-chip microcomputer and its software processing. Since the above-described distinction processes and the like can be realized by pattern matching or like method, a relatively low-cost one-chip microcomputer may be used for this purpose, thereby reducing the cost for the laser scanning sensor 100 as a whole. It should be noted, however, a one-chip microcomputer is not obligatory.

Optionally, a user may be allowed to change between whether or not the determination of the presence of the mirror 21 by the mirror surface determination unit 135 should be reflected to the alarm signal Dout1 sent out from the alarm output control unit 150. For example, a DIP switch to be operated by the user may be newly provided for this purpose. Alternatively, the changeover may be enabled on a software by flag information or the like stored in the memory 160.

In addition to the alarm signal Dout1, it is also possible to output a signal in accordance with the determination result by the mirror surface determination unit 135 alone. Instead of using an independent output signal, the determination result may be made identifiable on a software.

Although the mirror surface determination unit 135 and the human body determination unit 140 are separated in FIG. 1, determination of the mirror surface and the human body may be executed by a single determination unit.

<Basic Principle and General Processes of Mirror Surface Detection by the Laser Scanning Sensor 100>

Figure 3A:
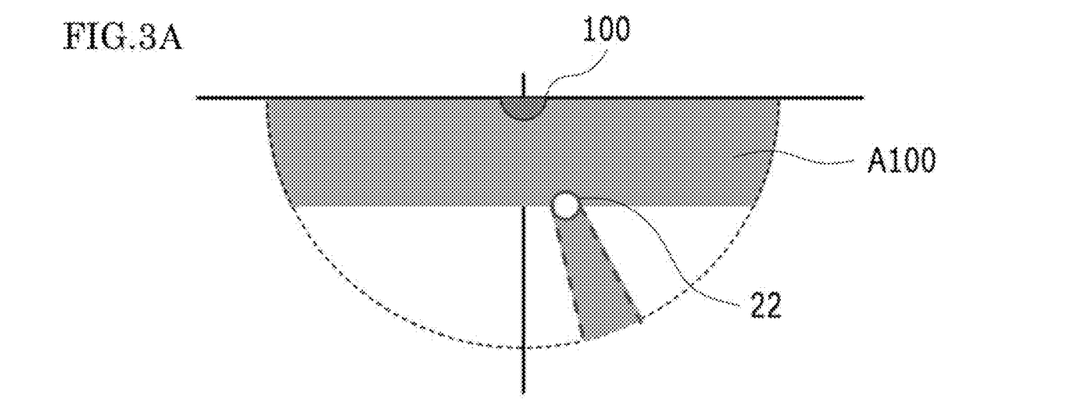
Figure 3B:
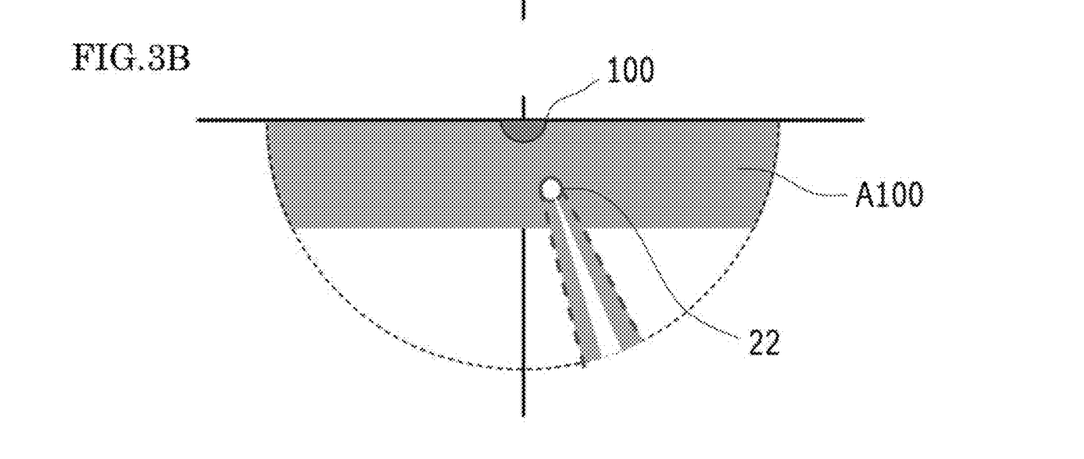

FIG. 3A and FIG. 3B are schematic explanatory illustrations for the basic principle of mirror surface detection by the laser scanning sensor 100. FIG. 3A shows a case where correct reflection information is not at all available. FIG. 3B shows a case where reflection information from the mirror is partially available.

As shown in FIG. 3A or FIG. 3B, when each piece of the distance data acquired in continuous measurement directions in a part of a detection area A100 is greater than the background distance data in the respective measurement directions, the laser scanning sensor 100, unlike the conventional art, does not simply determine that no object is present. Instead, the laser scanning sensor 100 is configured to suppose the probability of an intruder 20 holding a large mirror 21 or the like, and to perform human body determination by complementing the data as an object.

For example, as shown in FIG. 3A, when each piece of the distance data in continuous measurement directions having at least a predetermined width is greater than the corresponding background distance data, the laser scanning sensor 100 may be configured to treat the data as an object 22.

Alternatively, as shown in FIG. 3B, when each piece of the distance data in continuous measurement directions in a narrow range having the predetermined width or less is shorter than the corresponding background distance data, and at the same time when each piece of the distance data in continuous measurement directions adjoining one side or both sides of the above-mentioned measurement directions is greater than the corresponding background distance data, the laser scanning sensor 100 may be configured to treat the data as an object 22.

However, in order to prevent a false alarm due to activation of such complementation, it is preferable to set some limits, for example, as below.

1. Amount of increase relative to the distance to the ground surface 12
2. Maximum width and minimum width in the horizontal direction
3. Maximum width in continuous measurement directions
4. Minimum distance from the laser scanning sensor 100

Figure 4:
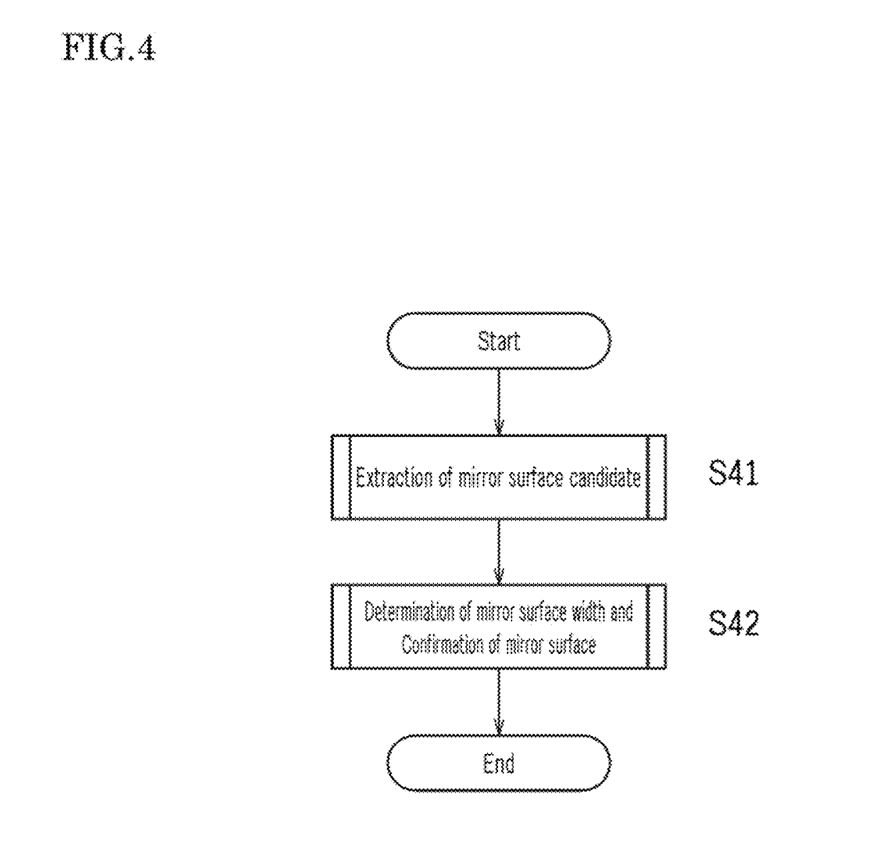
FIG. 4 is an outline flowchart that describes an example of a mirror surface confirmation process, from extraction of a mirror surface candidate to confirmation of a mirror surface, by the laser scanning sensor 100.
Figure 5:
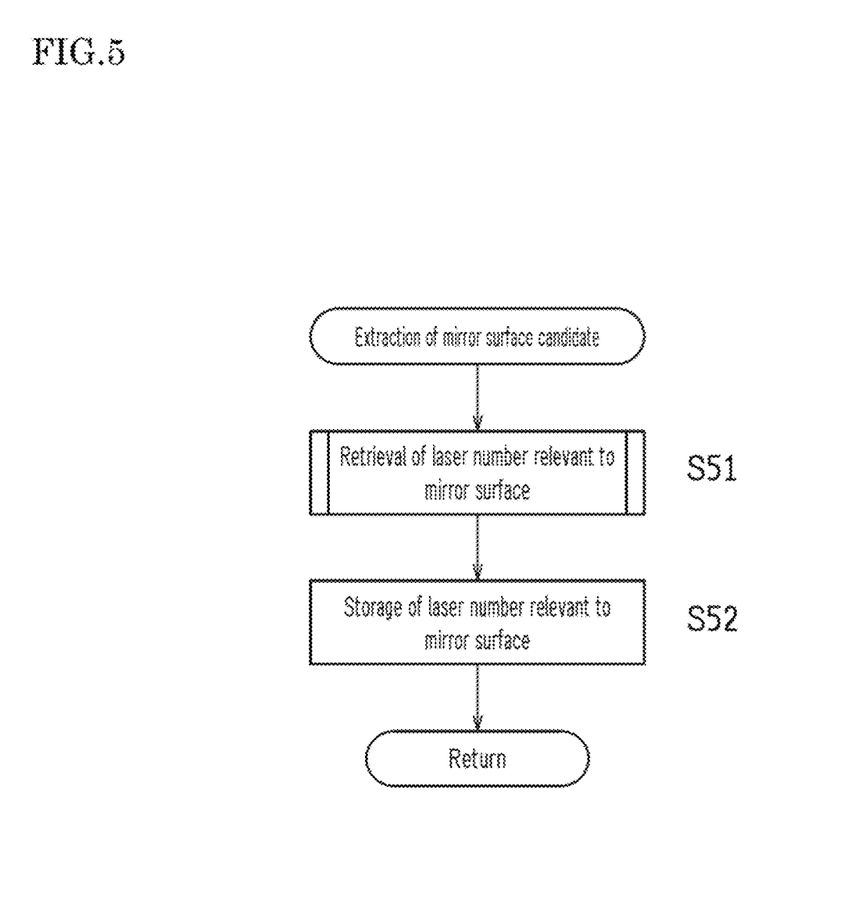
FIG. 5 is an outline flowchart that describes an example of a mirror surface candidate extraction process for extracting the mirror surface candidate.
Figure 6:
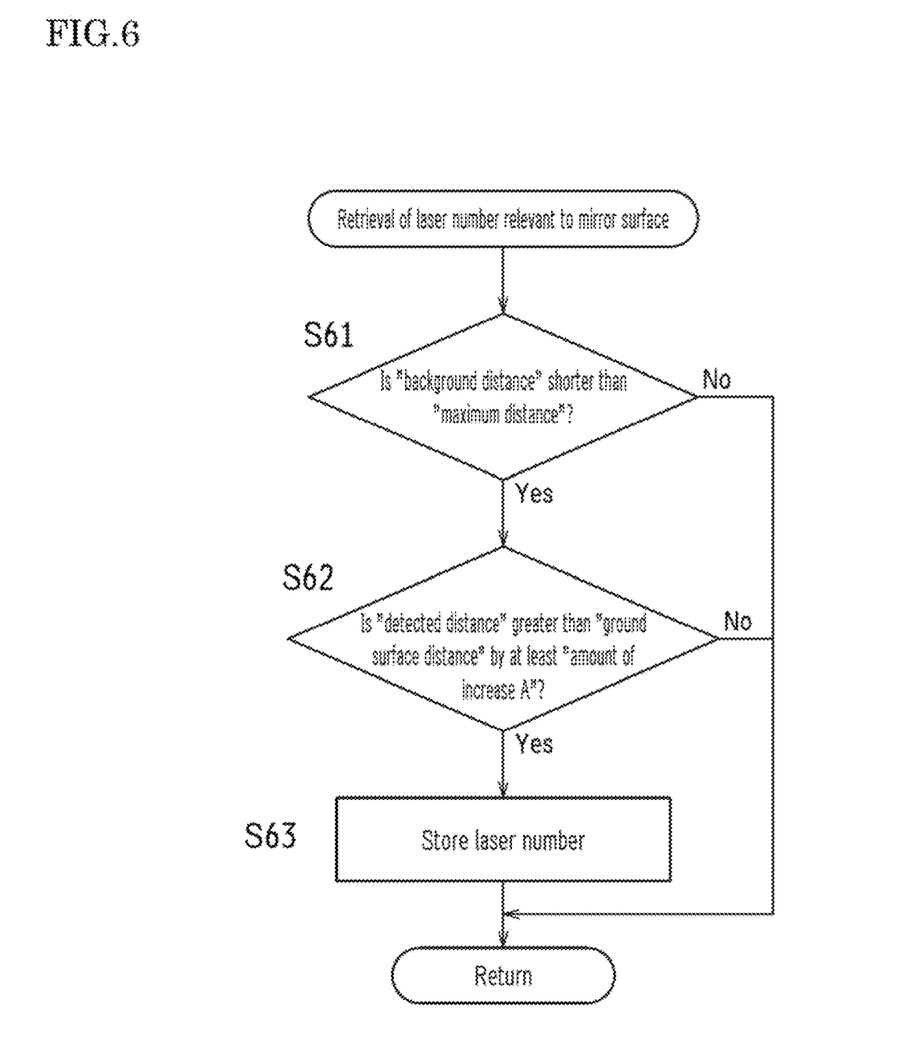
FIG. 6 is an outline flowchart that describes an example of a mirror surface laser number retrieval process for retrieving a laser number relevant to the mirror surface.
Figure 7:
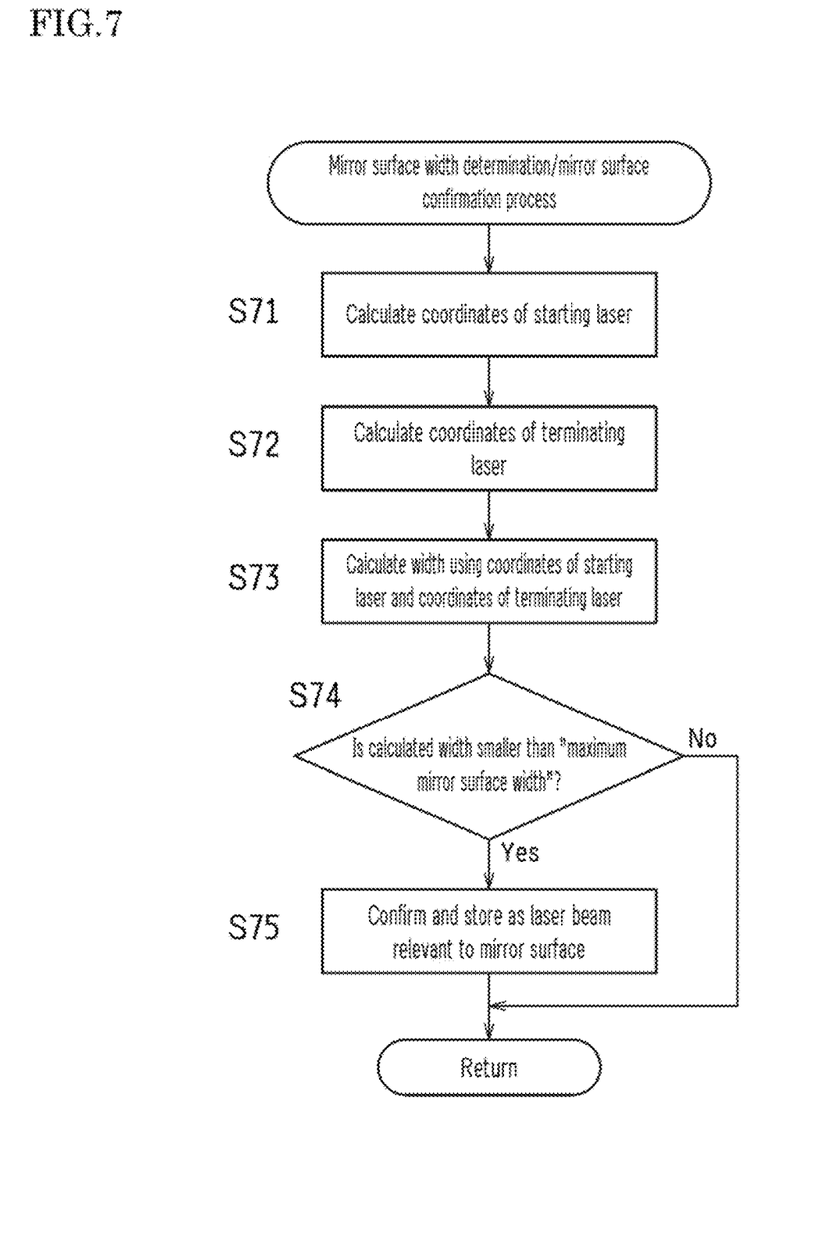
FIG. 7 is an outline flowchart that describes an example of a mirror surface width determination and mirror surface confirmation process for determining a mirror surface width and confirming the mirror surface candidate as a mirror surface.

FIG. 4 is an outline flowchart that describes an example of a mirror surface confirmation process, from extraction of a mirror surface candidate to confirmation of a mirror surface, by the laser scanning sensor 100. FIG. 5 is an outline flowchart that describes an example of a mirror surface candidate extraction process for extracting the mirror surface candidate. FIG. 6 is an outline flowchart that describes an example of a mirror surface laser number retrieval process for retrieving a laser number relevant to the mirror surface. FIG. 7 is an outline flowchart that describes an example of a mirror surface width determination and mirror surface confirmation process for determining a mirror surface width and confirming the mirror surface candidate as a mirror surface.

As shown in FIG. 4, "Extraction of mirror surface candidate" (see FIG. 5) is called to extract a mirror surface candidate (step S41). Next, "Determination of mirror surface width and Confirmation of mirror surface" (see FIG. 7) is called to confirm that the extracted candidate as a mirror surface (step S42).

FIG. 5 shows "Extraction of mirror surface candidate" called in step S41 of FIG. 4. In this process, "Retrieval of laser number relevant to mirror surface" (see FIG. 6) is called to retrieve the laser number relevant to the mirror surface (step S51). Next, the laser number extracted by the retrieval is stored (step S52), and then the process returns.

FIG. 6 shows "Retrieval of laser number relevant to mirror surface" called in step S51 of FIG. 5. This process determines whether the "background distance" is shorter than the "maximum distance" detectable by the laser distance meter 110 (step S61). If No, the process returns simply. If Yes, the process goes to next step S62.

This process further determines whether the distance detected by the laser (detected distance) is greater than the distance to the ground surface (ground surface distance) by at least an "amount of increase A" (step S62). If No, the process returns simply. If Yes, the laser number is stored (step S63), and then the process returns.

FIG. 7 shows "Determination of mirror surface width and confirmation of mirror surface" called in step S42 of FIG. 4. In this process, coordinates of a starting laser are calculated first (step S71), and coordinates of a terminating laser are also calculated (step S72). A width is calculated using the coordinates of the starting laser and the coordinates of the terminating laser (step S73).

This process determines whether the calculated width is smaller than the "maximum mirror surface width" (step S74). If No, the process returns simply. If Yes, the laser beam is confirmed to be relevant to the mirror surface and stored as such (step S75), and then the process returns.

Preferably, the confirmation that the laser beam is relevant to the mirror surface is not necessarily given immediately as described above. Instead, it is more preferable to keep monitoring thereafter and to finalize the confirmation when the change rate in a predetermined time exceeds a predetermined rate.

The laser scanning sensor 100 according to the present embodiment as described above is capable of detecting the intruder 20 using the mirror 21 or the like by distinguishing the reflection by the mirror surface, and can thereby prevent alarm failures as best as possible.

Note that the sensitivity of the mirror surface detection is substantially adjustable by a suitable change in the predetermined time and the predetermined ratio described above, "amount of increase A" in FIG. 6, "maximum mirror surface width" in FIG. 7, etc. For example, the sensitivity may be changeable in at least two stages.

The present invention can be implemented in other various manners without departing from its gist or principal characteristics. Therefore, the above-described embodiment is considered in all respects as illustrative and not restrictive. The scope of the invention is indicated by the appended claims rather than by the foregoing description. All variations and modifications falling within the equivalency range of the appended claims are intended to be embraced therein.

REFERENCE SIGNS LIST 10 laser scanning sensor (conventional art)
11 wall surface
12 ground surface
13 tree
20 intruder
21 mirror
22 object
100 laser scanning sensor
110 laser distance meter (laser range finder)
120 scanning mechanism
130 distance data acquisition unit
135 mirror surface determination unit
140 human body determination unit
150 alarm output control unit
160 memory

What is claimed is:

1. A laser scanning sensor comprising:
a laser distance meter which emits a laser beam, and which measures a distance to at least one object present in a direction of the laser beam, based on a time until the laser beam reflects off the at least one object and returns to the laser distance meter;
a scanning mechanism unit which changes a measurement direction by the laser distance meter;
a distance information acquisition unit which defines a detection area and which sequentially acquires distance information containing at least one distance measured in each measurement direction in the detection area, by allowing the scanning mechanism unit to change the measurement direction and allowing the laser distance meter to make a periodic measurement;
a detection area information storage unit which stores, as background distance information, a distance corresponding to an outer periphery of the detection area in each measurement direction;
a first determination unit which determines that a reflecting surface is present, wherein the presence of the reflecting surface is determined when the distance information acquired by the distance information acquisition unit, in continuous measurement directions corresponding to a predetermined width or less, is greater by at least a predetermined distance than the background distance information in the respective measurement directions stored in the detection area information storage unit, and when this state changes thereafter by at least a predetermined rate in a predetermined time;
a second determination unit which extracts a portion of the distance information that may correspond to a human body, the distance information having been acquired by the distance information acquisition unit, and which determines whether the extracted portion of the distance information corresponds to a human body, based on a sequential movement status regarding the extracted portion of the distance information; and
a first alarm signal output unit which outputs a first alarm signal when the first determination unit has confirmed the presence of the reflecting surface or when the second determination unit has confirmed the presence of the human body.

2. The laser scanning sensor according to claim 1, further comprising:
a first determination disabling unit which prevents the determination by the first determination unit from being reflected to the first alarm signal.

3. The laser scanning sensor according to claim 1,
wherein the first determination unit is capable of changing sensitivity in determining the presence of the reflecting surface, in at least two stages, by changing at least one of the predetermined width, the predetermined distance, the predetermined time, and the predetermined rate.

4. The laser scanning sensor according to claim 1, further comprising:
a second alarm signal output unit which outputs a second alarm signal when the first determination unit has determined the presence of the reflecting surface.

* * * * *